United States Patent [19]

Noble et al.

[11] Patent Number: 5,760,636

[45] Date of Patent: Jun. 2, 1998

[54] ADJUSTING CLOCK FREQUENCY AND VOLTAGE SUPPLIED TO A PROCESSOR IN A COMPUTER SYSTEM

[75] Inventors: James L. Noble; Don J. Nguyen, both of Portland; Frank P. Hart, Beaverton; Barnes Cooper, Aloha, all of Oreg.

[73] Assignee: Intel Corporation, Santa Clara, Calif.

[21] Appl. No.: 673,452

[22] Filed: Jun. 28, 1996

[51] Int. Cl.⁶ .................................................. H03K 3/72
[52] U.S. Cl. ........................ 327/513; 327/113; 327/512; 327/538; 307/651; 307/117
[58] Field of Search ........................ 327/113, 99, 143, 327/544, 530, 512, 513, 538, 535, 117, 115; 307/651

[56] References Cited

U.S. PATENT DOCUMENTS 5,021,679 6/1991 Fairbank et al. ........................ 306/66
5,258,662 11/1993 Skovmand ........................ 327/544
5,497,119 3/1996 Tedrow et al. ........................ 327/540

OTHER PUBLICATIONS

Linear Technology LT1173 DC–DC Converter, Linear Technology Data Sheet 0894 REV B, pp. 1–16 (1994).

*Primary Examiner*—Timothy P. Callahan
*Assistant Examiner*—Dinh Le
*Attorney, Agent, or Firm*—David J. Kaplan

[57] ABSTRACT

A method and apparatus for adjusting the clock frequency and voltage supplied to an integrated circuit. First, a signal is sent to the clock, and in response, the clock lowers the clock frequency supplied to the integrated circuit. The clock sends a signal to the voltage regulator whereupon the voltage regulator reduces the voltage supplied to the integrated circuit.

28 Claims, 3 Drawing Sheets

ADJUSTING CLOCK FREQUENCY AND VOLTAGE SUPPLIED TO A PROCESSOR IN A COMPUTER SYSTEM

FIELD OF THE INVENTION

The present invention relates to reducing the power consumption of a computer system and more particularly to adjusting the clock frequency and voltage supplied to the processor.

BACKGROUND OF THE INVENTION

A processor is typically considered to be the "brains" of computer systems and other electronic devices. Because of its central role, processors tend to be very heavily used in nearly every aspect of an electronic device's operation. For this reason, the processor of a computer system tends to require more power than virtually any other integrated circuit incorporated into a typical system. It therefore follows that if one were interested in reducing the total power consumed by the computer system, the place to start is with reduction of the power consumed by the processor of that system.

As the number of transistors incorporated into modern day integrated circuits increases, the power needed to drive these integrated circuits also increases. For example, it is not uncommon for a processor manufactured today to have upwards of five million transistors on a single chip. Only a few years ago, typical processors included only half as many transistors. As this trend of packing more and more power-hungry transistors into a single integrated circuit continues, techniques to reduce the overall power consumed by these integrated circuits becomes more important.

There are many reasons why one would be interested in reducing the power consumed by a computer system. For example, reduced power results in reduced cost of operation of the system. Also, much of the power drawn by a computer system is dissipated as heat within the system, and because this heat has been known to cause damage and malfunctions within the computer system, reducing the power consumed by the system effectively reduces damage and improves reliability of the system.

Perhaps the most important reason why one would seek to reduce the power consumed by a computer system, however, is in the arena of mobile electronic devices. Mobile electronic devices include battery operated computer systems such as, for example, notebook computers, sub-notebook computers, and personal data assistants. By reducing the power consumed by these and other battery operated devices, a user can enjoy extended use and operation of the system between battery charges. Therefore, primarily considering the advantages to be gained by battery operated computer systems, system manufacturers have invested considerable resources into researching and developing technologies to aid in the reduction of power consumed by processors within these mobile electronic devices.

The power consumed by a processor is known to be approximately proportional to the square of the voltage supplied to the processor times the frequency at which the processor operates [$P \alpha (V^2 \times f)$]. Given this relationship, it can be seen that reducing the frequency or the voltage will result in a reduction of the power consumed by the processor. Prior techniques have been attempted to reduce the voltage and/or frequency of the processor within a computer system. These techniques, however, typically require the incorporation of a lot of additional electronic elements into the computer system such as, for example, microcontrollers and their associated bus support circuitry. Unfortunately, because the space within mobile computer systems is very limited, the addition of electronic elements such as microcontrollers and buses results in an unacceptable increase in size, cost, and overall decrease in reliability of the total computer system.

SUMMARY AND OBJECTS OF THE INVENTION

An object of the invention is to provide an improved method for adjusting the clock frequency and voltage supplied to a processor.

Another object of the invention is to help reduce the power consumed by a processor.

A method and apparatus for adjusting the clock frequency and voltage supplied to an integrated circuit is described. First, a signal is sent to the clock, and in response, the clock lowers the clock frequency supplied to the integrated circuit. The clock sends a signal to the voltage regulator whereupon the voltage regulator reduces the voltage supplied to the integrated circuit.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

A method and apparatus is described for reducing the power consumed by a processor or other integrated circuit in a computer system by adjusting the clock frequency and voltage to the integrated circuit. In accordance with one embodiment of the present invention, a clock is coupled to and controls the frequency at which a processor operates. A voltage regulator is also coupled to the processor and determines the voltage at which the processor operates. In response to a particular predefined condition, the computer system signals the clock to lower its frequency, thereby lowering the frequency at which the processor operates. Once the frequency is reduced, the clock communicates directly with the voltage regulator, telling the voltage regulator to lower the voltage supplied to the processor. The voltage regulator complies, and the processor continues to operate in this low power mode, reducing the drain on the battery.

In response to another predetermined condition, the system signals to the clock to raise its frequency back up to the original operating frequency so that the processor can again operate at full speed. Before raising the frequency, however, the clock communicates directly with the voltage regular, telling the voltage regulator to raise its supply voltage back up to the original voltage level. The voltage regulator complies with this request and upon completion directly communicates back to the clock that the supply voltage has been raised. Upon receiving this information from the voltage regulator, the clock then raises the frequency back to the original value thereby allowing the processor to again operate at full speed.

Figure 1:
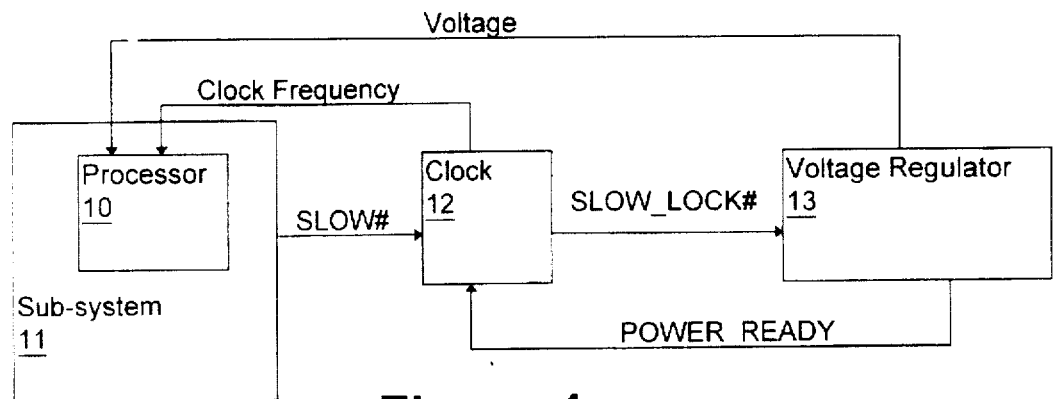
FIG. 1 is a block diagram showing the signal lines in accordance with one embodiment of the present invention.

The clock frequency and voltage adjustment architecture will be in more detail below along with timing diagrams to provide a more thorough description of the sequence of steps to follow to implement one embodiment of the present invention. Various other configurations and implementations in accordance with alternate embodiments of the present invention are described in more detail below FIG. 1 is a block diagram showing the connections and signals between blocks of a computer system in accordance with one embodiment of the present invention. Processor 10 is contained within subsystem block 11. Subsystem block 11 is coupled to clock 12 of the computer system via the signal line SLOW#. Clock 12 generates a clock frequency which is supplied to processor 10 as shown. Clock 12 is coupled to voltage regulator 13 via two signals lines, SLOW_LOCK# and POWER_READY. The voltage regulator 13 is coupled to a battery (not shown) in a battery operated computer system and generates a supply voltage which is supplied to processor 10 as shown.

Processor 10 within subsystem 11 uses the voltage supplied by voltage regulator 13 to power its operation. Processor 10 uses the clock frequency supplied by clock 12 to coordinate the execution of instructions within the processor. For one embodiment of the present invention, processor 10 includes circuitry that doubles, triples or otherwise multiplies the clock frequency by an integer or rational value before sending the clock signal on to internal execution units of the processor.

The SLOW# signal line may originate at any point within subsystem 11. For example, in accordance with one embodiment of the present invention, processor 10 itself initiates the SLOW# signal. For another embodiment of the present invention, subsystem 11 includes thermal detection circuitry which initiates the SLOW# signal. For an alternate embodiment of the present invention, subsystem 11 includes a hard-wired switch which a user of the computer system can use to manually assert or deassert the SLOW# signal. For some embodiments of the present invention, subsystem 11 includes, for example, a microcontroller, battery power detection circuitry, memory registers, or peripheral units which initiate the SLOW# signal.

In accordance with the embodiment of the present invention shown in FIG. 1, clock 12 is coupled directly to and is in direct communication with voltage regulator 13. In this manner, clock 12 asserts or deasserts the SLOW_LOCK# signal across the signal line directly to voltage regulator 13. Similarly, voltage regulator 13 asserts or deasserts the POWER_READY signal across the signal line directly coupled to clock 12. By enabling this direct communication between clock 12 and voltage regulator 13, additional circuit elements such as, for example, microcontrollers and bus support electronics, have effectively been eliminated from the computer system. Eliminating circuitry in this manner is particularly advantageous for mobile battery-operated computer systems in which space, weight, and costs must be kept to a minimum. In addition, reduction in the number of circuit elements in this manner improves the reliability of the computer system because there are fewer to malfunction.

In accordance with an alternate embodiment of the present invention, the SLOW_LOCK# signal line extends from the subsystem directly to the voltage regulator bypassing the clock. One purpose of the SLOW_LOCK# signal is to communicate to the voltage regulator when the clock frequency has reached its low frequency value. Therefore subsystem 11 can simply communicate this information directly to the voltage regulator. For example, in accordance with one embodiment of the present invention, the subsystem recognizes when the clock frequency from the clock has attained its low frequency value and subsequently asserts the SLOW_LOCK# signal to the voltage regulator indicating that it is time for the voltage regulator to lower its voltage supply to the processor. For another embodiment of the present invention, a system designer determines the length of time the clock takes to lower its frequency to the desired value and then simply inserts propagation delays between the SLOW# signal line and the voltage regulator. In this manner, the same SLOW# signal that initiates the frequency drop by the clock is received by the voltage regulator a sufficient enough time later so that the clock has attained its desired low frequency value before the voltage regulator begins to drop its voltage supply to the processor.

Figure 2:
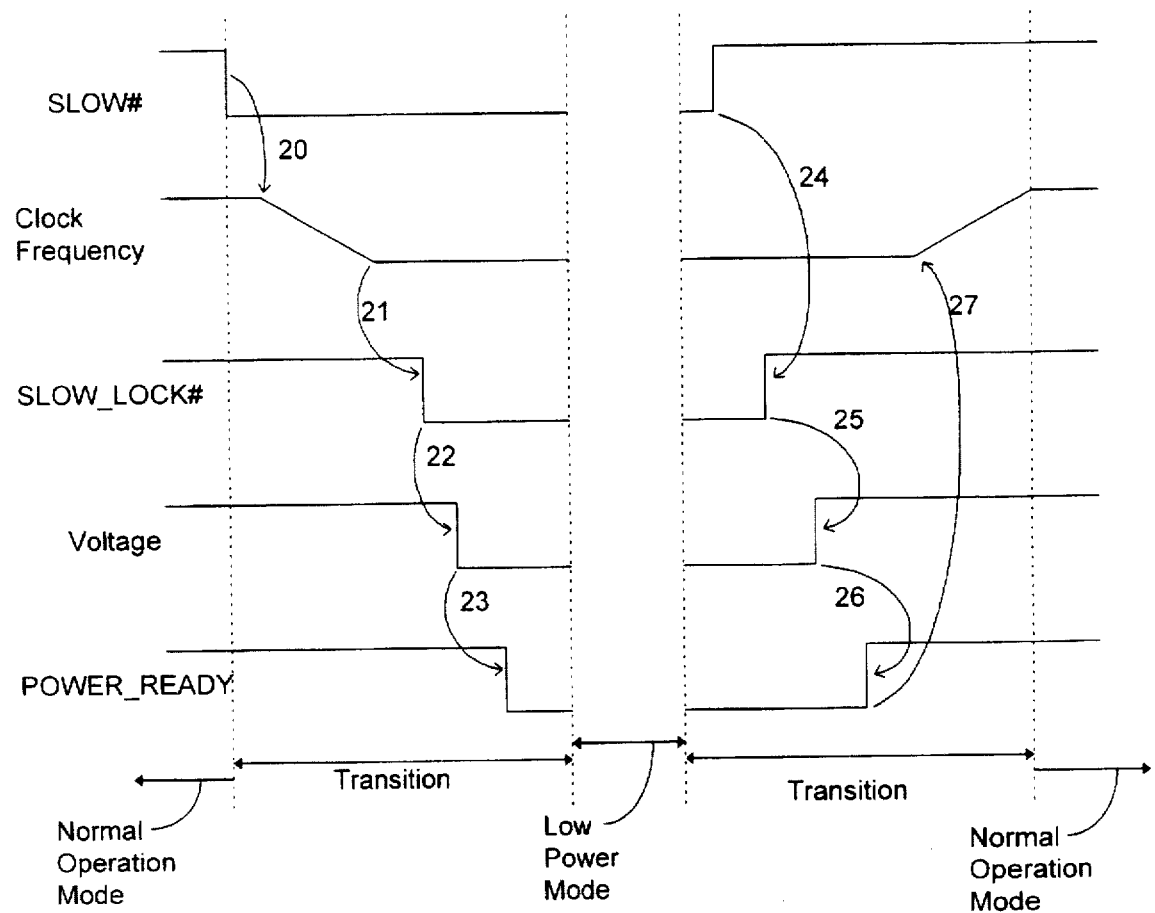
FIG. 2 is a timing diagram showing the signals on the signal lines of FIG. 1 for two modes of operation and the transitions between modes in accordance with one embodiment of the present invention.

FIG. 2 is a timing diagram showing the signals on the signal lines of FIG. 1 for two modes of operation of the processor, normal operation mode and low power mode, along with the transitions between these two modes in accordance with one embodiment of the present invention. As shown, while the processor is in its normal operation mode, the SLOW# signal is deasserted (high) the SLOW_LOCK# signal is also deasserted (high) and the POWER_READY signal is asserted (high). In addition, as shown, the clock frequency and voltage to the processor are also high. A "high" clock frequency value simply means that the clock is generating a frequency which causes the internal processor frequency to run at the upper nominal value for the processor. More generally, however, a "high" clock frequency is to simply be considered a frequency which is higher than the lower low clock frequency described below. Similarly, a "high" voltage is meant to identify the voltage supply level to the processor approximately equal to the upper nominal voltage supply value for the processor clocked at the high frequency. More generally, however, a "high" voltage is simply meant to indicate a voltage supply level which is higher than the lower low voltage described below.

Based on the occurrence of certain conditions monitored by the computer system, some of which will be described in more detail below, the SLOW# signal is asserted, driving the signal low as shown. Note that although the assertion and deassertion of various signals are described herein, the associated transitions of those signals from one logical state to another may be defined in either direction. It is to be understood that the assertion or deassertion of any particular signal coupled to the input of a block of circuitry is nothing more than merely sending a signal to that circuit block. For example, assertion of the SLOW# signal of FIG. 2 is nothing more than a method by which the system or subsystem of FIG. 1 sends a signal to the clock to indicate the beginning of a transition from the normal operation mode to the low power mode. This sending or communicating of a signal from the system to the clock can be implemented in any number of ways in accordance with alternate embodiments of the present invention.

For example, for one embodiment of the present invention, the SLOW# signal is active high rather than active low, in which case assertion of the signal results in a transition of the signal from a logical low state to a logical high state. For another embodiment of the present invention, a signal is sent by deasserting rather than asserting the signal across a signal line. Note that the assertion of an active low signal is physically equivalent to the deassertion of an active high signal. Therefore, it is to be appreciated that the terms assertion and deassertion as used herein are interchangeable depending upon whether the particular signal being asserted or deasserted is defined as active high or active low.

For another embodiment of the present invention, a signal is communicated (or sent) from one block or circuitry to another by sending a digital binary value across interconnect lines between the two circuit blocks. The binary value may communicate any of a number of messages. For another embodiment of the present invention, alternate communication methods are used to send a signal. Therefore, all the signals sent from one block to another described herein can be implemented in any number of ways in accordance with alternate embodiments of the present invention. The assertion and deassertion of single independent signal lines as described in conjunction with FIGS. 1 and 2 is but one way of sending the necessary signals between and among various regions of the computer system.

After the SLOW# signal is initiated as shown in FIG. 2, lowering of the clock frequency by the clock to the processor is initiated at step 20. Clock frequency is then lowered in a smooth manner from a high clock frequency to a lower clock frequency. This smooth adjustment of clock frequency helps to ensure that the processor and computer system are able to continue operating throughout the transition from the normal operation mode to the lower power mode. In accordance with one embodiment of the present invention, the transition from normal operation mode to lower power mode as well as the transition from the low power mode back to the normal operation mode both involve dynamic clock frequency adjustment in that the processor, along with the rest of the computer system, continues to execute instructions for the user throughout the transitional periods. For another embodiment of the present invention, execution and operation of the processor within the computer system is halted during the transitions from normal operation mode to low power mode and back to normal operation mode. For this embodiment, the clock frequency may be more abruptly adjusted, thereby significantly shortening the transition time from normal operation mode to low power mode and from low power mode back to normal operation mode.

Once the clock frequency has been lowered to the low frequency value, the clock sends a signal to the voltage regulator at step 21 by asserting the SLOW_LOCK# signal. For one embodiment of the present invention, the point at which the clock reaches the low frequency value is detected within the clock using a phase locked loop circuit. Currently, the high clock frequency for a typical computer system is approximately 60 MHz or 66 MHz. For embodiments such as this, the low clock frequency value may be in the range of approximately 45 MHz to 55 MHz.

Once the low clock frequency has been reached and the clock asserts the SLOW_LOCK# signal at step 21, the voltage regulator receives the SLOW_LOCK# signal and in response proceeds to reduce the voltage it supplies to the processor at step 22. The voltage regulator lowers the voltage supplied to the processor from a high voltage to a low voltage, which for a typical mobile computer system built today might be approximately 2.9 volts and 2.75 volts, respectively. Even though the voltage may only be reduced by approximately 150 millivolts in accordance with one embodiment of the present invention, this voltage adjustment can have a profound impact on reducing the amount of power consumed by the processor to which the voltage is supplied. This is because, as explained above, the power consumed by an integrated circuit is proportional to the square of the voltage supplied to the integrated circuit rather than the linear relationship between power and the frequency at which the integrated circuit operates.

As the final step, once the voltage regulator has lowered the voltage to the low voltage level, the voltage regulator sends a signal back to the clock by deasserting POWER_READY. At this point, the processor is said to have entered the low power mode which sacrifices the speed of operation of the processor, as measured by its clock frequency, for the ability to operate while consuming less power than the processor consumes during its normal operation mode.

In accordance with one embodiment of the present invention, the low frequency and low voltage levels are preset by the computer system designer. For another embodiment of the present invention, the computer system user sets their own lower limits on clock frequency and voltage supplied to the processor. An advantage to this particular embodiment is that the user can determine how to optimize computer system performance, as measured by the clock frequency of the processor, versus available battery power in a battery-operated computer system to best suit the user's particular needs.

Transitioning from low power mode back to normal operation mode involves similar direct communication between circuit blocks via the signal lines in a slightly different order. Initially, the subsystem signals the clock to transition back out of low power mode and into normal operation mode by deasserting the SLOW# signal. In response to this signal, the clock then sends a signal to the voltage regulator by deasserting the SLOW_LOCK# signal at step 24. In response to receiving this signal, the voltage regulator raises the voltage supply to the processor back up from the low voltage, low power mode to the high voltage, normal operation mode at step 25. After the voltage has been increased to this high voltage level, the voltage regulator then asserts the POWER_READY signal to the clock in step 26. The clock receives this POWER_READY signal and recognizes that it is now permissible for the clock to raise the clock frequency back up to the high frequency value at step 27. In accordance with the embodiment of the present invention shown in FIG. 2, the clock frequency adjustments during both types of transitions are conducted in a smooth manner that supports dynamic transitioning such that data processing continues by the processor and computer system throughout the transition periods.

Note that according to the sequence of events of FIG. 2, the clock frequency is reduced or increased during the transition periods only when the voltage regulator supplies a high voltage to the processor. This is done because typical processors are unable to meet the rigid clock transition timing specifications when the clock frequency is high and the voltage supply level is low. Therefore, by ensuring that the clock frequency value only goes high when the voltage supply to the processor is also high, proper operation of the processor is maintained.

For an alternate embodiment of the present invention, however, the sequence of events is modified such that the clock frequency supplied to the processor from the clock is at a high value while the voltage supplied to the processor by the voltage regulator is at a low value. For embodiments in which this occurrence would otherwise cause the processor to operate in an unreliable or unspecified state, operation of the processor is halted during the transition period. As stated above, one advantage to halting the operation of the processor during the transition period is that the clock frequency can be more quickly adjusted, thereby reducing the time it takes for the processor to transition between the normal operation and low power modes.

Figure 3:
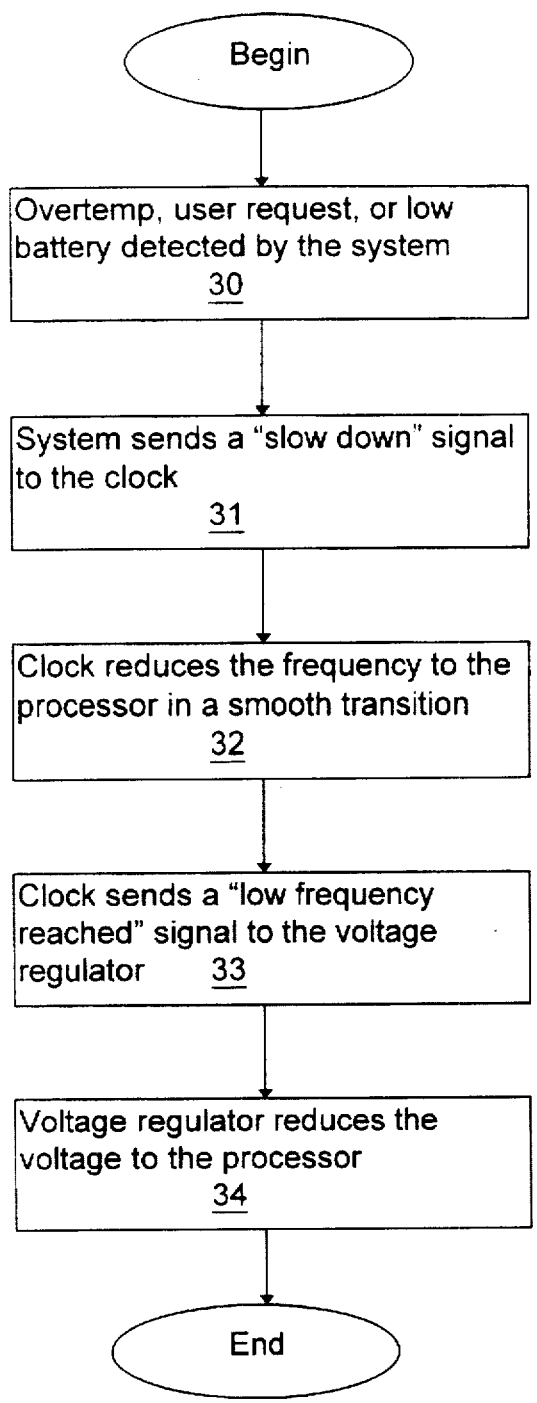
FIG. 3 is a flow chart for placing the computer system into low power mode operation in accordance with one embodiment of the present invention.

FIG. 3 is a flow chart showing a sequence of events for placing a computer system, and more particularly the processor or other integrated circuit of the computer system, into a low power mode in accordance with one embodiment of the present invention. At the first step, a subsystem of the computer system detects one of several possible events that triggers a transition to the lower power mode such as, for example, an overtemp condition, a user request, or a low battery power condition detected by the system. An overtemp condition occurs when the temperature of, for example, the processor of the computer system has exceeded a critical value above which continued operation of the system becomes unstable or unreliable. For one embodiment of the present invention, overtemp detection circuitry comprises a thermocouple disposed in proximity to the processor and coupled to a comparator. The comparator compares the thermocouple voltage or current to a reference value corresponding to the critical temperature, and transitions the logical state of its output whenever this reference value is exceeded. As explained above, much of the power consumed by the processor in a computer system is dissipated as heat. Therefore, by lowering the power consumption of the processor when it overheats, less heat is produced, thereby allowing the processor to cool off.

Another event that triggers a transition into the low power mode in accordance with an embodiment of the present invention is the detection of a user request for the lower power mode. This user request can come via the computer system software interface, such as when a user selects, for example, a low power mode icon on the display screen of the computer. Alternatively, a hardware mechanism is used whereby a switch is provided to the user that can be manually toggled to alternatively select the low power or normal operation modes. One reason a user might select a low power mode, causing the processor to operate at a slower speed, is if the user desires to sacrifice processor speed in exchange for extended battery life between charges in a battery operated computer system.

A third event that can trigger the transition into the low power mode is the detection of a low battery power condition. Currently, in battery-operated computer systems, such as, for example, notebook computers, the system warns the user when the battery power approaches a critically low value. This warning generally affords the user a minimal amount of time to save their work and shut down the system before the system is automatically shut down. Otherwise data may be lost. In accordance with one embodiment of the present invention, upon detecting a low battery power condition, the computer system instead transitions into the lower power mode, thereby extending the use of what little power remains in the battery, affording the user additional time to finish working.

After the event that indicates the desirability of transitioning into a low power mode is detected by the system at step 30, the system sends a "slow down" signal to the clock at step 31. This signal indicates to the clock that the system desires to enter into the low power mode. As described above, the sending of a signal such as this can be implemented by, for example, asserting or deasserting a signal on a single signal line. For an alternate embodiment, a binary value is sent to the clock and is interpreted by the clock to be a request for transition into the low power mode.

After the clock receives this signal at step 31, the clock reduces the frequency supplied to the processor at step 32. In accordance with one embodiment of the present invention, this lowering of the frequency supplied to the processor is implemented as a smooth transition from a high frequency to a low frequency as described above.

Next, the clock sends a "low frequency reached" signal to the voltage regulator at step 33. This signal indicates to the voltage regulator that the clock has reduced its frequency to the predetermined value and it is now permissible for the voltage regulator to reduce the voltage supplied to the processor. At step 24, the voltage regulator reduces the voltage supplied to the processor and the processor is now considered to have entered its low power mode of operation.

Figure 4:
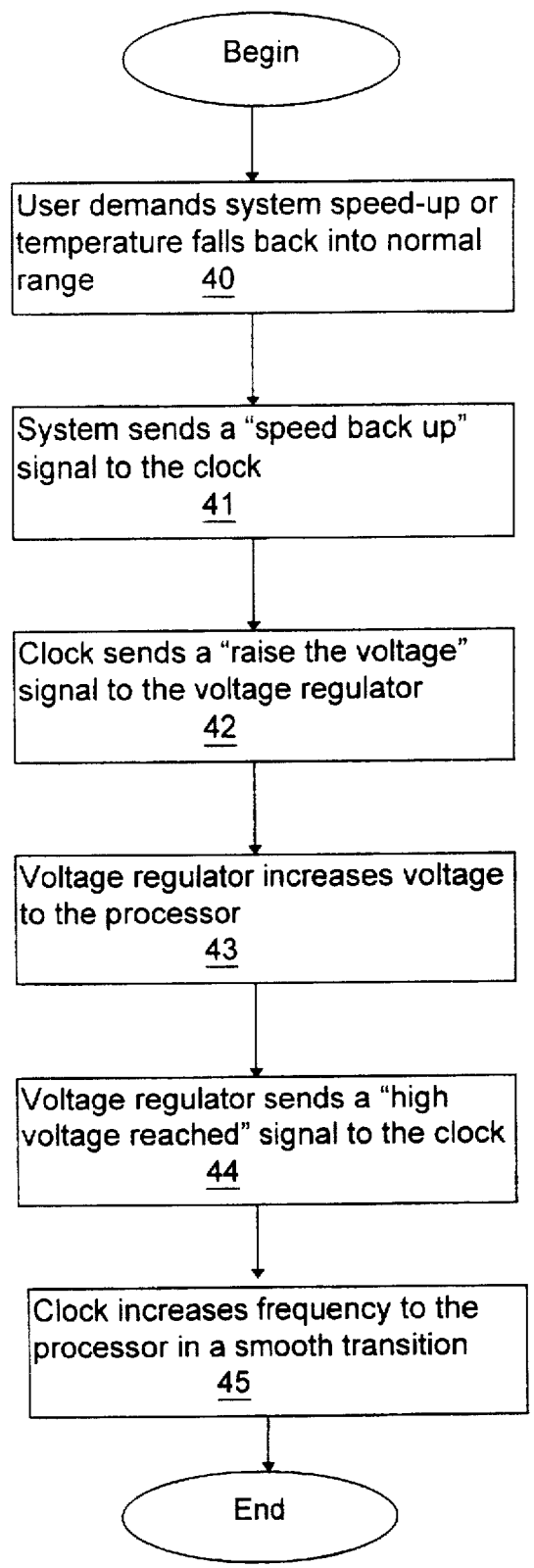
FIG. 4 is a flow chart for bringing the computer system out of low power mode accordance with one embodiment of the present invention.

FIG. 4 is a flow chart of the steps to be taken to bring a computer system, and more particularly, the processor within the computer system, out of the low power mode and back into the normal operation mode. At the first step, step 40, some event is detected by a subsystem, which indicates the desirability of bringing the processor out of low power mode and back up to full speed. For example, as explained above, in accordance with one embodiment of the present invention, the system is placed into the low power mode due to a low battery power condition being detected by the system. For one embodiment, a user may desire to override this automatic placement into the low power mode so that the user can, for example, finish working in an application which requires the processor to operate at the high frequency. In such a case, the user may demand system speed up, requiring that the clock increase its frequency and the system transition back into the normal operation mode. For another embodiment of the present invention in which the system has entered the low power mode as a result of an overtemp condition being detected, the system transitions back into the normal operation mode once the processor has cooled off and the overtemp condition ends.

Once the system detects an event indicating the desirability to transition back into the normal operation mode at step 40, the system sends a "speed back up" signal to the clock at step 41. In response, the clock sends a "raise the voltage" signal to the voltage regulator at step 42. The voltage regulator then increases the voltage supply to the processor at step 43 after which time the voltage regulator sends a "high voltage reached" signal back to the clock, indicating that it is now permissible for the clock to raise the clock frequency supplied to the processor at step 44. The clock receives this signal and at step 45 increases the clock frequency supplied to the processor in a smooth transition, allowing the system to continue operation throughout the transitional period.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of adjusting power consumption of a computer processor, the method comprising the steps of:

sending a first signal from a computer subsystem comprising the computer processor to a clock in response to a first predetermined condition, the clock having a frequency;

decreasing the frequency of the clock from a high frequency to a low frequency in response to the first signal from the computer subsystem;

applying the low frequency of the clock to the processor;

sending a second signal from the clock to a voltage regulator in response to the decreasing of the clock frequency, the voltage regulator having an output voltage;

decreasing the output voltage of the voltage regulator from a high voltage to a low voltage in response to the second signal from the clock; and applying the low output voltage of the voltage regulator to the processor.

2. The method of claim 1, further comprising the steps of:

sending a third signal from the computer subsystem to the clock in response to a second predetermined condition;

sending a fourth signal from the clock to the voltage regulator in response to the third signal from the computer subsystem;

increasing the output voltage of the voltage regulator from the low voltage to the high voltage in response to the fourth signal;

applying the high voltage of the voltage regulator to the processor;

sending a fifth signal from the voltage regulator to the clock after the output voltage is increased;

increasing the frequency of the clock from the low frequency to the high frequency in response to the fifth signal; and applying the high frequency of the clock to the processor.

3. The method of claim 1, wherein the second signal is sent from the clock to the voltage regulator after the frequency is decreased.

4. The method of claim 1, wherein the processor, the computer subsystem, the clock, and the voltage regulator are part of a battery-operated computer system, and the first predetermined condition is a low battery power condition detected by the computer subsystem.

5. The method of claim 1, wherein the first predetermined condition is a request for low power mode operation detected by the computer subsystem.

6. The method of claim 1, wherein the first predetermined condition is an overtemp condition detected by the computer subsystem.

7. The method of claim 2, wherein the second predetermined condition is a request for normal operation mode detected by the computer subsystem.

8. The method of claim 2, wherein the second predetermined condition is detected by the computer subsystem after an overtemp condition ends.

9. A method of adjusting power consumption of a computer processor, the method comprising the steps of:

asserting a first signal from a computer subsystem comprising the computer processor to a clock in response to a first predetermined condition, the clock having a frequency;

asserting a second signal from the clock to an adjustable voltage regulator in response to the first signal, the adjustable voltage regulator having an output voltage;

increasing the output voltage of the adjustable voltage regulator from a low voltage to a high voltage in response to the second signal;

asserting the high voltage of the adjustable voltage regulator to the processor;

asserting a third signal from the adjustable voltage relator back to the clock after the high voltage is reached by the adjustable voltage regulator;

increasing the clock frequency from a low frequency to a high frequency in response to the third signal; and asserting the high frequency of the clock to the processor.

10. The method of claim 9, further comprising the steps of:

deasserting the first signal to the clock in response to a second predetermined condition;

decreasing the clock frequency from the high frequency to the low frequency in response to the first signal;

deasserting the clock frequency to the processor;

deasserting the second signal after the low frequency is reached by the clock;

decreasing the output voltage of the adjustable voltage regulator from the high voltage to the low voltage in response to the second signal; and deasserting the output voltage of the adjustable voltage regulator to the processor.

11. The method of claim 9, wherein the first predetermined condition is a request for normal operation mode detected by the computer subsystem.

12. The method of claim 9, wherein the first predetermined condition is a normal temperature condition detected by the computer subsystem.

13. The method of claim 10, wherein the second predtermined condition is a low battery power condition detected by the computer subsystem.

14. The method of claim 10, wherein the second predetermined condition is a request for low power mode operation detected by the computer subsystem.

15. The method of claim 10, wherein the second predetermined condition is an overtemp condition detected by the computer subsystem.

16. A computer system comprising:

a processor;

a clock having a clock input coupled to a computer subsystem comprising the processor, a first clock output coupled to the processor, and a second clock output, the first clock output supplying a clock frequency to the processor and transitioning to a lower clock frequency when the clock input receives a first signal, the second clock output sending a second signal when the clock frequency transitions to the lower clock frequency; and a voltage regulator having a regulator input coupled to the second clock output, and a regulator output coupled to and supplying a voltage to the processor, the regulator output transitioning to a lower voltage when the second signal is received at the regulator input.

17. The computer system of claim 16, wherein the computer system is battery-operated.

18. The computer system of claim 17, wherein the first signal is sent from the computer subsystem to the clock input in response to detecting a low battery power condition.

19. The computer system of claim 16, wherein the first signal is sent from the computer subsystem to the clock input in response to receiving a request for low power mode operation.

20. The computer system of claim 16, wherein the first signal is sent to the clock input from the computer subsystem in response to an overtemp condition.

21. A method of adjusting power consumption of a computer processor, the method comprising the steps of:

sending a first signal from a computer subsystem comprising the processor to a clock in response to a first predetermined condition, the clock having a frequency;

decreasing the frequency of the clock from a high frequency to a low frequency in response to the first signal from the computer subsystem;

applying the low frequency of the clock to the processor;

sending a second signal from the computer subsystem to a voltage regulator after the frequency of the clock is decreased, the voltage regulator having an output voltage;

decreasing the output voltage of the voltage regulator from a high voltage to a low voltage in response to the second signal from the computer subsystem; and applying the low voltage of the voltage regulator to the processor.

22. The method of claim 21, wherein the processor, the computer subsystem, the clock, and the voltage regulator are part of a battery-operated computer system, and the first predetermined condition is a low battery power condition detected by the computer subsystem.

23. The method of claim 21, wherein the first predetermined condition is a request for low power mode operation detected by the computer subsystem.

24. The method of claim 21, wherein the first predetermined condition is an overtemp condition detected by the computer subsystem.

25. A method of adjusting power consumption of a computer processor, the processor having a supply voltage, the method comprising the steps of:

sending a first signal from a computer subsystem to a clock in response to a first predetermined condition, the clock having a frequency;

decreasing the frequency of the clock from a high frequency to a low frequency in response to the first signal from the computer subsystem;

applying the low frequency of the clock to the processor;

decreasing the supply voltage of the processor from a high voltage to a low voltage in response to the decreasing of the frequency of the clock; and applying the low voltage to the processor.

26. The method of claim 25, wherein the processor, the computer subsystem and the clock are part of a battery-operated computer system, and the first predetermined condition is a low battery power condition detected by the computer subsystem.

27. The method of claim 25, wherein the first predetermined condition is a request for low power mode operation detected by the computer subsystem.

28. The method of claim 25, wherein the first predetermined condition is an overtemp condition detected by the computer subsystem.

* * * * *

UNITED STATES PATENT AND TRADEMARK OFFICE
CERTIFICATE OF CORRECTION

PATENT NO. : 5,760,636
DATED : June 2, 1998
INVENTOR(S) : Noble et al.

It is certified that error appears in the above-identified patent and that said Letters Patent is hereby corrected as shown below:

In column 10 at line 1 delete "relator" and insert --regulator--

In column 10 at line 27-28 delete "predtermined" and insert --predetermined--

Signed and Sealed this

Twenty-seventh Day of October, 1998

Attest:

BRUCE LEHMAN

*Attesting Officer*    *Commissioner of Patents and Trademarks*